(12) United States Patent
Sellers

(10) Patent No.: US 6,437,972 B1
(45) Date of Patent: Aug. 20, 2002

(54) KEYBOARD WITH INTERIOR STIFFENING RIBS

(75) Inventor: Charles A. Sellers, Houston, TX (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/429,113

(22) Filed: Oct. 27, 1999

(51) Int. Cl.[7] .................................................. G06F 1/16
(52) U.S. Cl. ....................... 361/680; 361/679; 345/168; 200/5 A
(58) Field of Search ................................ 361/679, 680; 345/168; 200/5 A, 344, 513, 534, 472, 490

(56) References Cited

U.S. PATENT DOCUMENTS

| | | | | |
|---|---|---|---|---|
| 4,084,214 A | * | 4/1978 | Eppich | 361/394 |
| 5,717,429 A | * | 2/1998 | Coulon et al. | 345/168 |

\* cited by examiner

*Primary Examiner*—Darren Schuberg
*Assistant Examiner*—Yean-Hsi Chang

(57) ABSTRACT

A notebook computer has a keyboard including a deflectable base plate on the top side of which a series of parallel rows of depressible key structures are operatively mounted. The base plate is structurally reinforced, without increasing the overall height of the keyboard, using elongated stiffening ribs disposed within the interior of the keyboard. The ribs longitudinally extend parallel to the key rows, are anchored beam-like to the top side of the base plate, and are interdigitated with the key rows.

14 Claims, 2 Drawing Sheets

KEYBOARD WITH INTERIOR STIFFENING RIBS

BACKGROUND OF THE INVENTION

1. Field of the Invention

The present invention generally relates to keyboard apparatus and, in a preferred embodiment thereof, more particularly relates to a notebook computer keyboard having a deflectable base plate reinforced with stiffening ribs secured thereto and interdigitated with rows of keys mounted thereon.

2. Description of Related Art

As computer keyboards, particularly notebook computer keyboards, become thinner and thinner the keyboard stiffness (i.e., resistance to downward deflection while being typed on) is correspondingly being reduced. If the keyboard lacks stiffness and the system does not provide sufficient support to the keyboard, the keyboard can feel "spongy" while the customer types on it. This keyboard deflection can be undesirably equated by the user to poor quality construction.

As typically constructed, notebook computer keyboards include a deflectable metal base plate on the top side of which the depressible key portions of the keyboard are mounted. Conventional methods for increasing the stiffness of keyboards of this type include (1) increasing the thickness of the keyboard base plate, (2) changing to a stiffer base plate material (for example, from aluminum to cold rolled steel), and (3) attaching stiffener plates to the bottom side of the base plate.

Each of these three conventional approaches to stiffening the deflectable base plate portion of a notebook computer keyboard carries with it at least one disadvantage. For example, there is typically a weight penalty when the keyboard base plate material is changed to a stiffer material.

If the keyboard base plate thickness is increased, or stiffener plates are secured to the bottom side of the base plate, there are thickness and/or weight penalties.

From the foregoing it can readily be seen that a need exists for improved structure for providing a keyboard of the type generally described above with increased stiffness.

It is to this need that the present invention is directed.

SUMMARY OF THE INVENTION

In carrying out principles of the present invention, in accordance with a preferred embodiment thereof, an electronic device, representatively a portable notebook computer, is provided with a specially designed structurally reinforced keyboard.

The keyboard, in a preferred embodiment thereof, includes a deflectable base member having a top side, a parallel plurality of laterally spaced rows of depressible key structures supported on the top side of the base member, and a plurality of elongated stiffening ribs longitudinally extending parallel to the key rows, anchored to the top side of the base member, and interdigitated with the key rows. Because of the unique placement of the stiffening ribs on the top side of the base member, coupled with the interdigitation of the ribs with the key rows, the ribs substantially stiffen the base plate, and thus the entire keyboard, from the inside of the keyboard. In this manner a desirable enhancement of the overall rigidity of the keyboard is achieved without undesirably increasing its overall height.

Preferably, the deflectable base member has a generally plate-shaped configuration, and the stiffening ribs have generally plate-shaped main body portions anchored in a beam-like orientation on the top side of the base member. In a preferred configuration thereof, each stiffening rib has a lower side edge from which an elongated securement tab portion laterally projects transversely to the main body portion of the stiffening rib, and the securement tab portion of each stiffening rib is anchored to the top side of the deflectable base member.

According to another aspect of the invention, each of the key structures includes a key member having a bottom side and being movable toward and away from the top side of the base member between downwardly depressed and upwardly extended positions, respectively, and the bottom sides of the key members have notches formed therein and positioned to receive portions of the securement tabs when the key members are moved to their downwardly depressed positions.

In accordance with another feature of the invention, the main body portions of the stiffening ribs have top side edges, each of the key members has an upper side, and the top side edges of the stiffening rib main body portions are positioned so as to be located generally level with the upper side of each key member when the key member is moved to its downwardly depressed position. In this manner, the stiffening ribs do not interfere with the depression of the key members or undesirably come into contact with the keyboard user's fingers as the key members are depressed during typing on the keyboard.

DETAILED DESCRIPTION

Figure 1:
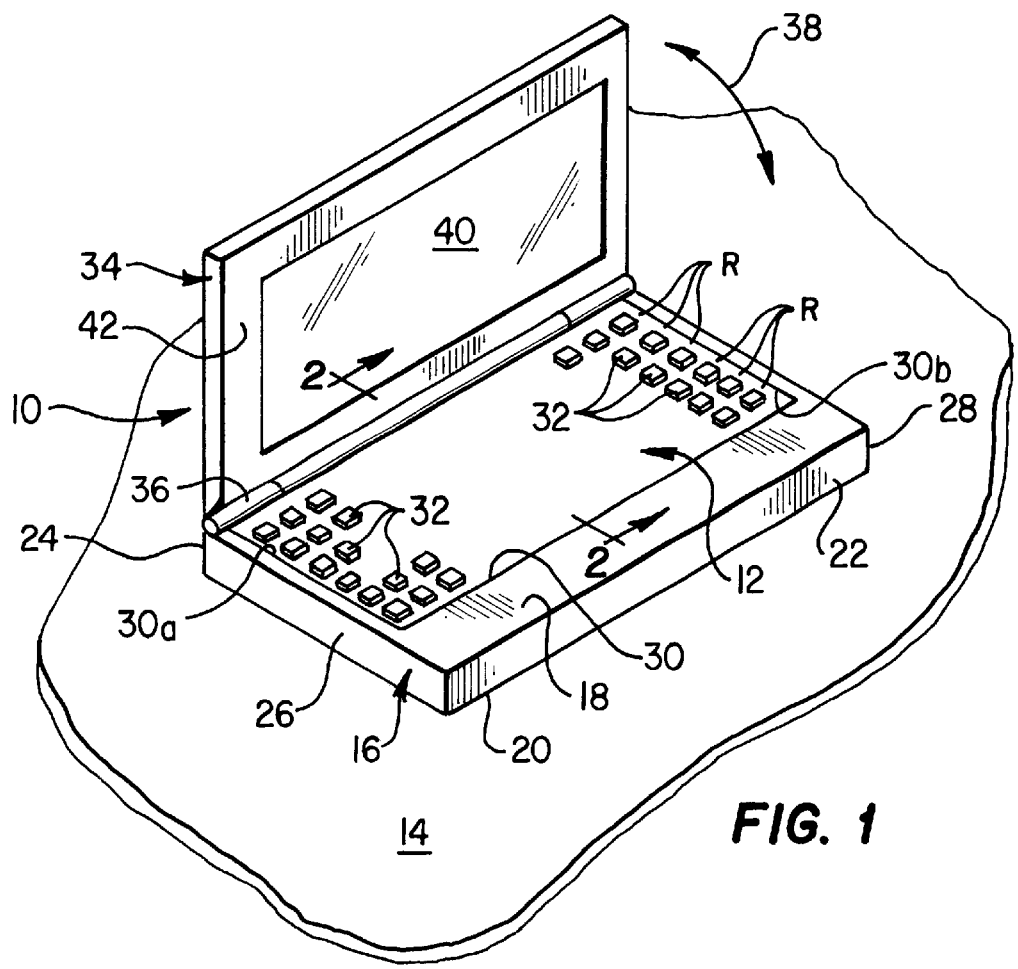
FIG. 1 is a simplified perspective view of an opened notebook computer having incorporated therein an improved keyboard embodying principles of the present invention.

Perspectively illustrated in FIG. 1 is an electronic device, representatively a portable notebook computer 10, which incorporates therein a specially designed keyboard 12 embodying principles of the present invention. The computer 10 is shown resting atop a suitable horizontal support surface, such as a desktop 14, and includes a rectangular base housing 16 having top and bottom sides 18 and 20, front and rear sides 22 and 24, and left and right ends 26 and 28.

The keyboard 12 is complementarily received in an elongated rectangular opening 30 formed in the top base housing side 18 and having opposite left and right ends 30a, 30b. Keyboard 12 has a series of manually depressible key members 32 generally arranged in various laterally spaced parallel rows R that longitudinally extend in a left-to-right direction relative to the base housing top side opening 30.

In addition to its base housing 16, the computer 10 also has a somewhat thinner rectangular lid housing 34 which is hinge-secured, as at a hinge 36, to a rear top side portion of the base housing 16 for pivotal movement relative thereto (as indicated by the double-ended arrow 38 in FIG. 1) between a generally upright open use orientation (shown in FIG. 1) in which the lid housing 34 exposes the keyboard 12, and a downwardly tilted closed storage and transport orientation in which the lid housing 34 extends across and parallel to the top base housing side 18 and covers the keyboard 12.

A suitable latch structure (not shown) is provided for releasably locking the lid housing 34 in this closed storage and transport orientation. Lid housing 34 has a rectangular display screen 40 mounted on the front or inner side 42 thereof, the display screen 40 facing forwardly and being exposed to user view, as shown in FIG. 1, when the lid housing 34 is in its open use orientation.

Figure 2:
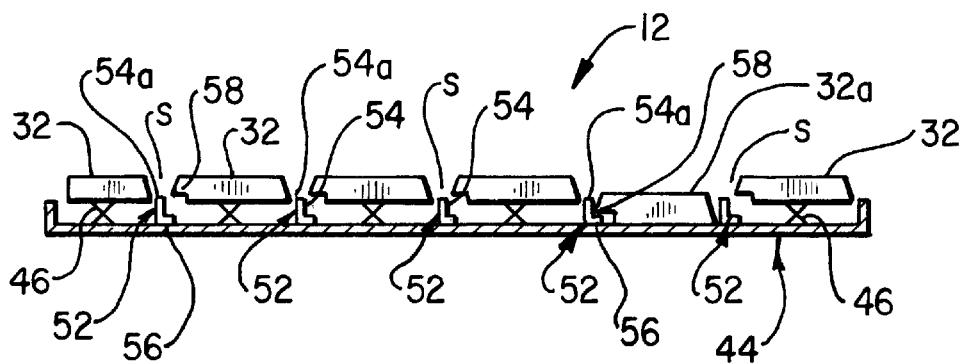
FIG. 2 is an enlarged scale simplified cross-sectional view through the keyboard, taken along line 2—2 of FIG. 1, with various components of the keyboard having been removed for purposes of illustrative clarity.
Figure 3:
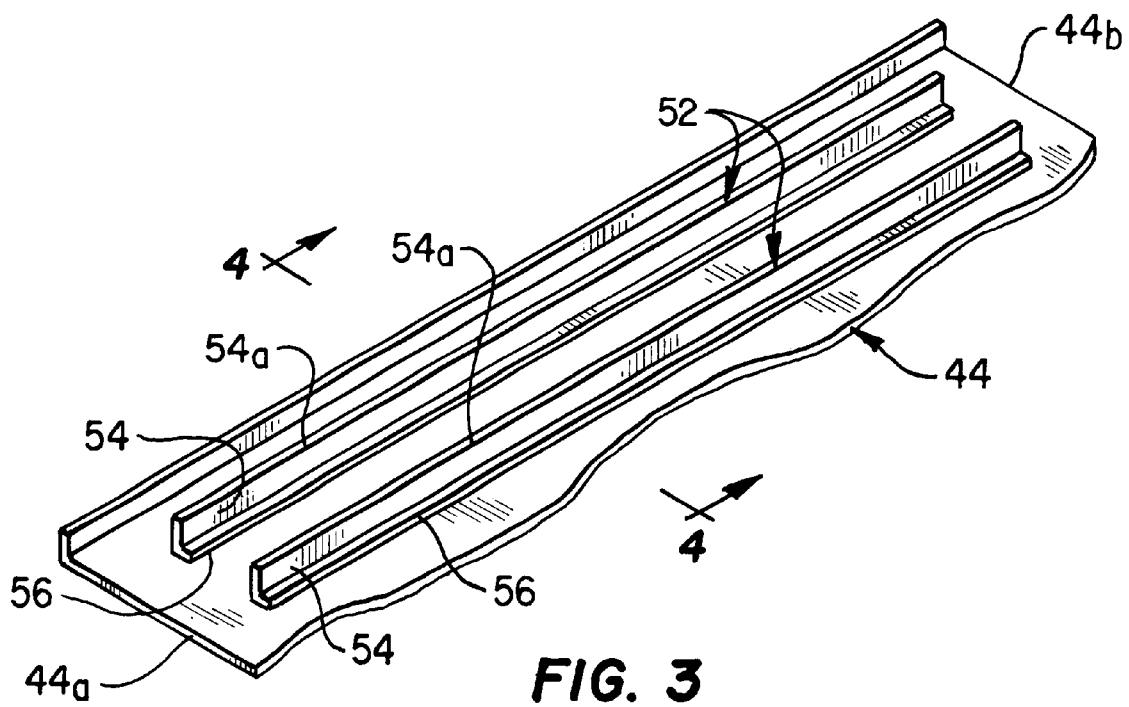
FIG. 3 is an enlarged scale perspective view of part of a deflectable base plate portion of the keyboard with stiffening ribs embodying principles of the present invention being anchored to its top side.
Figure 4:
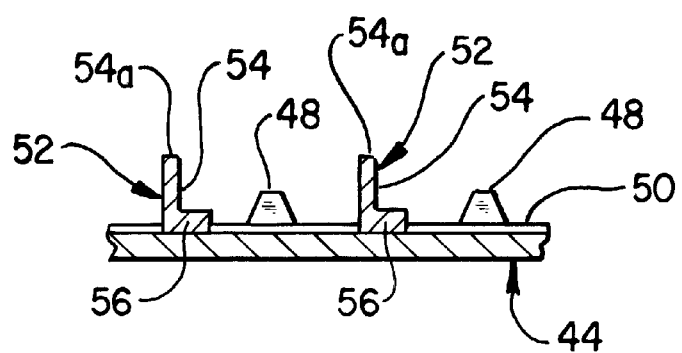
FIG. 4 is an enlarged scale cross-sectional view taken through the base plate along line 4—4 of FIG. 3 and further illustrating signal pad and key switch portions of the keyboard.

Turning now to FIGS. 2–4, a bottom side portion of the keyboard 12 is defined by a deflectable base plate member 44 which is representatively formed from a relatively thin sheet of a suitable light weight metal material such as aluminum. Base plate 44 has an elongated rectangular configuration, and has opposite left and right ends 44a, 44b which, with the keyboard 12 operatively installed in the computer 10, are respectively adjacent the left and right ends 30a, 30b of the base housing top side opening 30.

The parallel rows R of key members 32 are mounted on the top side of the base plate 44 by suitable support means, such as the conventional scissor linkages 46 schematically depicted in FIG. 2. Underlying the key members 32 are resilient return spring members 48 (see FIG. 4) which are operatively positioned atop a multi-layer signal pad structure 50 secured to the top side of the base plate 44. The spring members 48 and the signal pad 50 are of conventional construction, with the spring members 48 representatively being elastomeric key return dome members.

Each of the keys 32 is upwardly biased by its underlying return spring member 48 to an upwardly extended ready-to-use orientation, and is manually movable to a downwardly depressed position (as in the case of the key 32a shown in FIG. 2) against the resilient resistance of its return spring member 48. When a particular key 32 is so depressed, it downwardly deforms its associated return spring member 48 and, in a conventional manner, causes the deformed return spring member to forcibly close a switch (not shown) embedded in the signal pad 50. This, in turn, causes circuitry extending through the pad structure 50 to generate an appropriate key output signal.

According to a primary aspect of the present invention, the deflectable base plate 44 of the keyboard 12 is structurally reinforced in a unique manner substantially stiffening the base plate 44 without increasing the height of the keyboard. This is achieved by placing elongated stiffening rib members 52 in a unique orientation within the interior of the keyboard 12.

Still referring to FIGS. 2–4, each stiffening rib 52 is representatively formed from a strip of relatively stiff material (such as steel) and has an elongated, generally plate-shaped main body portion 54 with an upper edge 54a. Extending outwardly from the lower edge of the main body portion 54 is a transverse securement tab portion 56. As best illustrated in FIG. 3, the stiffening ribs 52 longitudinally extend parallel to the left-to-right length of the base plate 44 in a laterally spaced relationship, with the stiffening rib securement tab portions 56 being suitably anchored to the top side of the base plate 44.

This, in turn, anchors the stiffening rib body portions 54 in a beam-like manner transversely to the top side of the deflectable base plate 44. As can best be seen in FIG. 2, the stiffening ribs 52 are positioned on the top side of the base plate 44 in a manner such that their upwardly projecting main body portions 54 are received in the spaces S between adjacent pairs of key rows R (see FIG. 1) when the keys 32 are installed on the base plate 44. The vertical heights of the stiffening rib main body portions 54 are sized in a manner such that when any one of the keys 32 is depressed (see, e.g., the key 32a in FIG. 2), its top side is generally level with the top side edges 54a of the stiffening ribs 52 immediately to the front and rear of the key. This prevents the stiffening ribs 52 from interfering with the user's fingers or the depression of the keys 32. As indicated in FIG. 2, clearance notches 58 are formed in lower rear corner portions of the keys 32 to receive portions of the stiffening rib securement tabs 56 when the keys 32 are depressed to allow full downward travel of the keys.

By interdigitating the upwardly projecting stiffening rib body portions 54 with the rows R of keys 32 within the interior of the keyboard 12, the deflectable base plate 44, and thus the entire keyboard assembly 12, is structurally reinforced without the necessity of increasing the height of the keyboard 12. Additionally, since such rib body portions 54 are oriented in a beam-like manner on the top side of the base plate 44, they may be relatively thin so that the stiffening ribs 52 do not substantially increase the overall weight of the keyboard 12.

While the cross-section of the stiffening ribs 52 along their lengths has a generally L-shaped configuration (which makes the ribs particularly easy to shape), it will be readily appreciated by those of skill in this particular art that the stiffening ribs could be formed in a variety of alternate cross-sectional configurations if desired. Additionally, while the structurally reinforced keyboard 12 has been representatively incorporated in a notebook computer 10, it will be readily appreciated that it could be alternatively incorporated in or utilized in conjunction with a variety of other electronic devices as well.

The foregoing detailed description is to be clearly understood as being given by way of illustration and example only, the spirit and scope of the present invention being limited solely by the appended claims.

What is claimed is:

1. A keyboard comprising:
   a deflectable base member having a top side;
   a parallel plurality of laterally spaced rows of depressible key structures supported on said top side of said base member; and
   a plurality of elongated stiffening ribs longitudinally extending parallel to said key rows, anchored to said top side of said base member, and interdigitated with said key rows, said stiffening ribs having generally plate-shaped main body portions anchored in a beam-like orientation on said top side of said base member.

2. The keyboard of claim 1 wherein said deflectable base member has a generally plate-shaped configuration.

3. The keyboard of claim 1 wherein said keyboard is a computer keyboard.

4. The keyboard of claim 3 wherein said computer keyboard is a notebook computer keyboard.

5. The keyboard of claim 1 wherein:
   each stiffening rib has a lower side edge from which an elongated securement tab portion laterally projects transversely to the main body portion of the stiffening rib, and
   the securement tab portion of each stiffening rib is anchored to said top side of said base member.

6. The keyboard of claim 5 wherein:

each of said key structures includes a key member having a bottom side and being movable toward and away from said top side of said base member between downwardly depressed and upwardly extended positions, respectively, and said bottom sides of said key members have notches formed therein and positioned to receive portions of said securement tabs when said key members are moved to said downwardly depressed positions.

7. The keyboard of claim 1 wherein:

said main body portions of said stiffening ribs have top side edges, each of said key structures includes a key member having an upper side of said base member between downwardly depressed and upwardly extended positions, respectively, and said top side edges of said main body portions of said stiffening ribs are positioned so as to be located generally level with upper side of each key when the key is moved to its downwardly depressed position.

8. An electronic device having structurally reinforced keyboard, said structurally reinforced keyboard comprising:

a deflectable base member having a top side;

a parallel plurality of laterally spaced rows of depressible key structures supported on said top tide said base member; and a plurality of elongated stiffening ribs longitudinally extending parallel to said key rows, anchored to said top side of said base member, and interdigitated with said key rows, said stiffening ribs have generally plate-shape main body portions anchored in a beam-like orientation on said top side base member.

9. The electronic device of claim 8 wherein said deflectable base member has a generally plate-shaped configuration.

10. The electronic device of claim 8 wherein said electronic device is a computer.

11. The electronic device of claim 10 wherein said computer is a notebook computer.

12. The electronic device of claim 8 wherein:

each stiffening rib has a lower side edge from which an elongated securement tab portion laterally projects transversely to the main body portion of the stiffening rib, and the securement tab portion of each stiffening rib is anchored to said top side of said base member.

13. The electronic device of claim 12 wherein:

each of said key structures includes a key member having a bottom side and being movable toward and away from said top side of said base member between downwardly depressed and upwardly extended positions, respectively, and said bottom sides of said key members have notches formed therein and positioned to receive portions of said securement tabs when said key members are moved to said downwardly depressed positions.

14. The electronic device of claim 8 wherein:

said main body portions of said stiffening ribs have top side edges, each of said key structures includes a key member having an upper side and being movable toward and away from said top side of said base member between downwardly depressed and upwardly extended positions, respectively, and said top side edges of said main body portions of said stiffening ribs are positioned so as to be located generally level with the upper side of each key when the key is moved to its downwardly depressed position.

* * * * *